April 8, 1969 W. R. BATTERSBY 3,437,063
METHODS FOR MAKING CONTAINER BODIES USING
THERMOPLASTIC ADHESIVE
Original Filed July 6, 1965
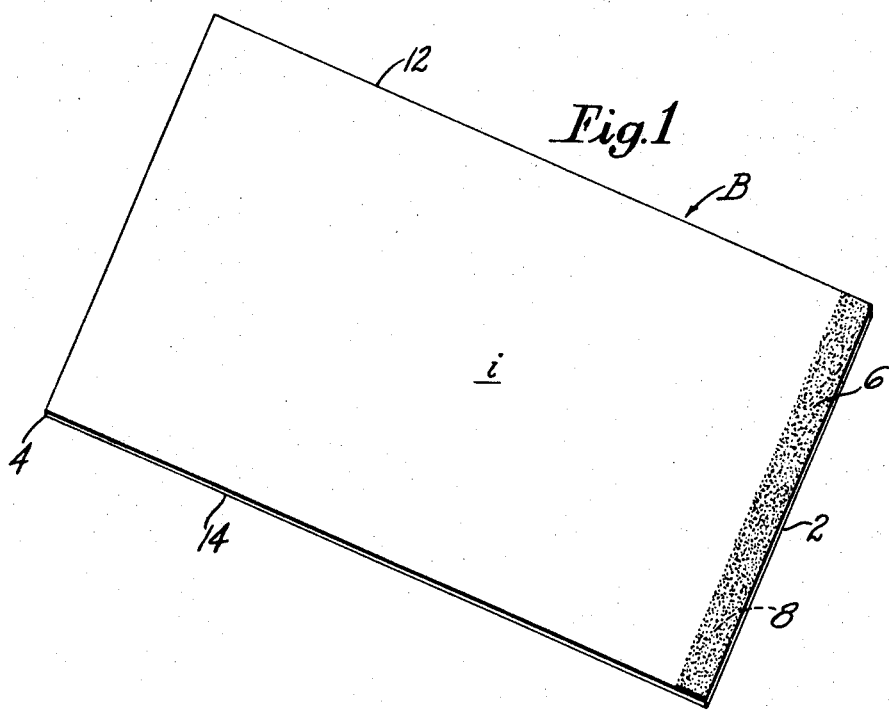
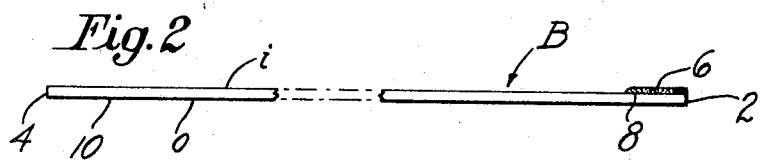
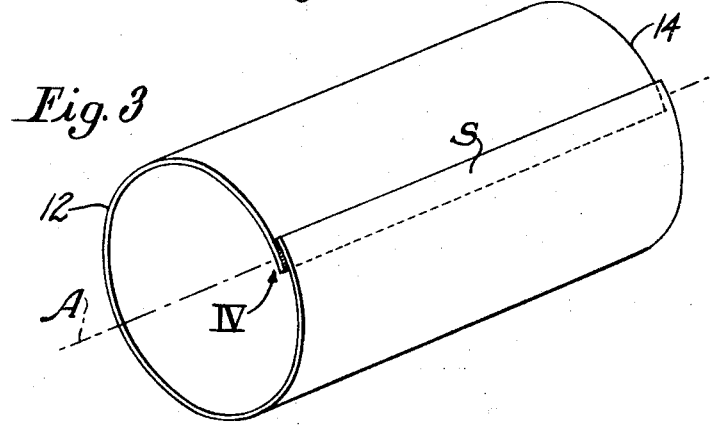
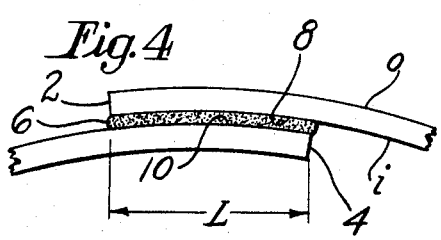
Inventor:
William R. Battersby
By his Attorney
Benjamin C. Pollard

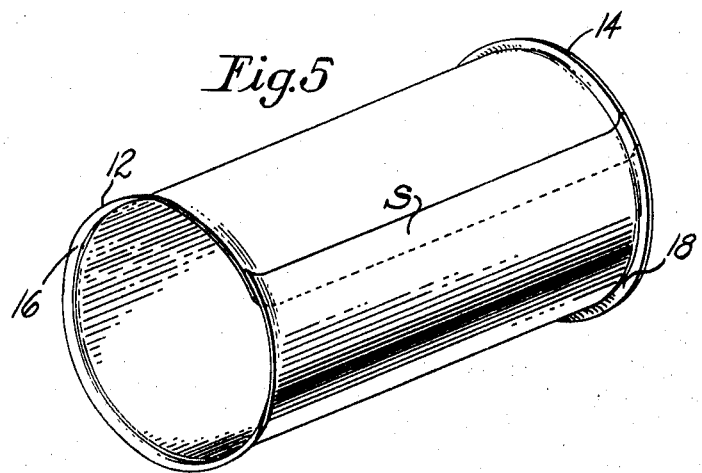
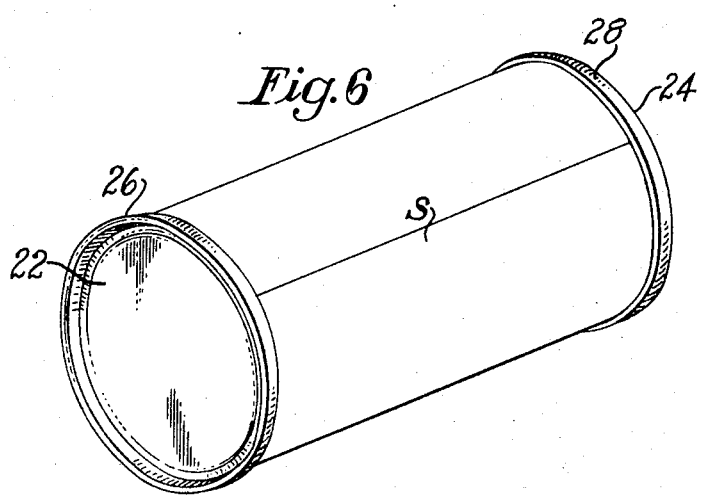

United States Patent Office 3,437,063
Patented Apr. 8, 1969

3,437,063
METHODS FOR MAKING CONTAINER BODIES USING THERMOPLASTIC ADHESIVE
William R. Battersby, Lexington, Mass., assignor to United Shoe Machinery Corporation, Flemington, N.J., a corporation of New Jersey
Original application July 6, 1965, Ser. No. 469,513, now Patent No. 3,329,740, dated July 4, 1967. Divided and this application Apr. 28, 1967, Ser. No. 634,761
Int. Cl. B21d 51/04, 51/10; B65d 3/04
U.S. Cl. 113—121                                     8 Claims

ABSTRACT OF THE DISCLOSURE

A method for making container bodies in which thermoplastic adhesive having controlled delay hardening ability is applied to a side seaming surface portion of a metallic container blank and the blank is formed into a tubular body with the adhesive in heat activated condition between the side seaming surface portion on which it is applied and an opposite side seaming surface portion. Portions, e.g. end edge portions, are deformed e.g. flanged, the adhesive is caused to increase in hardness and the ends attached to the tubular body. Thereafter, the adhesive is caused to advance further in hardening.

---

This application is a division of my copending application Ser. No. 469,513, filed July 6, 1965, entitled, "Thermoplastic Adhesive Prepared From Crystallizable Polyester Resin and Amorphous Phenoxy Resin," now U.S. Patent No. 3,329,740, issued on July 4, 1967.

Field of the invention

This invention relates to a method for making metallic container bodies including side seaming with a thermoplastic adhesive composition.

Description of the prior art

Bonding of metallic surfaces such as the side seams of tubular container bodies traditionally has been effected by welding, brazing or soldering. Serious difficulties have been encountered in attempts to use organic adhesives, not only in securing adhesion of sufficient strength but also in providing flexibility and temperature resistance to withstand process conditions. Cements having the ability to form bonds possessing limited yield properties for periods necessary for effective working of parts, e.g. the flanging of can ends, have, in general, failed because cements capable of remaining yieldably adhesive lacked the strength in the final bond to meet the stresses imposed.

Summary of the invention

It is an object of the present invention to provide a method for making container bodies using organic resin base adhesive activatably by heat for side seaming metallic container blanks, in which the conditions encountered in the various steps aid in developing properties in the adhesive joint for meeting conditions encountered in succeeding steps.

To this end and in accordance with a feature of the present invention thermoplastic adhesive is applied in molten condition to side seaming surface portions, the side seaming portions are brought together with the adhesive in heat activated condition and thereafter the adhesive is caused to progress in hardness and strength during the stages of completion of a container body.

Brief description of the drawing

The above and other features of the invention will be more particularly described with reference to the accompanying drawings and pointed out in the claims. It will be understood that the adhesive method is useful in forming adhesive joints other than that involved in the particular container body shown for purposes of illustration.

In the drawings,

FIG. 1 is a perspective view of a container blank useful in making container bodies using the method of this invention;

FIG. 2 is an edge view of the sheet shown in FIG. 1 taken in the direction of the arrow II;

FIG. 3 is a perspective view of a partially completed container body made from the blank shown in FIG. 1;

FIG. 4 is an edge view of the seam of the container body of FIG. 3 taken in the direction of the arrow IV;

FIG. 5 is a perspective view of the container body after flanging of the end edges; and FIG. 6 is a perspective view of a completed container.

It will be appreciated that the various drawings are not necessarily scale drawings of either the tubular bodies or components thereof but have been enlarged, modified and portions emphasized to assist in pointing out more clearly various features of the invention.

Description of the preferred embodiments

FIGS. 1 and 2 show a body blank B which comprises a flat rectangular sheet of conventional tin plate, i.e. sheet steel plated on both surfaces with tin. The blank also may be of aluminum, other ferrous or nonferrous materials or composite metal and fiber laminates. The upper surface of the blank B, i.e. that which faces the viewer in FIG. 1, is designated surface $i$ and the lower or opposite surface is designated $o$. They are so designated since these are the surfaces which will ultimately constitute the inside and outside of the tubular body. The rectangular blank has opposite parallel edges 2 and 4. Organic thermoplastic adhesive of the type mentioned above is applied in a band 6 about ¼" wide to one or both side seaming margins 8 and 10 beginning at the edges 2 and/or 4.

To form the body, the blank B is bent or curved into tubular configuration (usually but not necessarily cylindrical) about a central longitudinal axis A (FIG. 3) with the opposed parallel edges 2 and 4 and their adjacent side seaming margins 8 and 10 overlapping and the adhesive band or bands 6 disposed between the side seaming margins. The amount of overlap (designated generally as L in FIG. 4) is approximately ¼" measured circumferentially of the body. In its tubular configuration the seaming margin 8 engages the side seaming margin 10 on outer surface O of the body. The side seaming margins are then held together and heat is applied to reactivate the adhesive to form a lap seam S. Upon cooling the seam S is completely sealed.

FIG. 5 shows the resulting side seamed tubular body with end edge portions 12 and 14 deformed to provide outwardly flared flanges 16 and 18 for engagement with container ends. The step of so deforming the edge portions imposes severe stresses particularly in the seam area and it has been found desirable that the adhesive of the seam allow limited yield without rupture.

The completed container 20 (FIG. 6) includes end members 22 and 24 with edge portions 26 and 28 crimped around the flanges by an end seaming operation.

Preferred operating conditions for efficient utilization of materials and space in the manufacture of container bodies call for an in-line operation in which the bodies are formed with adhesive side seaming and are promptly passed to successive operations. In the manufacture of cans for carbonated beverages, for example, beer cans, these operations may include inside seam striping, interior lacquer coating and drying, end flanging, securing a bottom end member to the body portion by end seaming, filling, securing a top end member to the body portion by end seaming and pasteurizing. Through the in-line operation the necessity for storing large quantities of container bodies is avoided and handling of the bodies is reduced to a minimum.

The adhesive used in the method of the present invention meets the requirements imposed by in-line operation that the adhesive side seam develop strength rapidly on cooling from heat activated condition so that it is not ruptured by the stresses imposed by the flanging operations on the body, while at the same time the adhesive does not reach a stage in which it is completely unyieldable so that it is able to accommodate minor relative movements between the overlapping portions without disruption of the adhesive bond or of the can body material. The adhesive rapidly develops strength and heat resistance such that the temperatures involved in drying a lacquer coating on its interior do not unduly weaken it to allow the seam to spring open under the stress of the resilience of the metal. The limited heating involved in drying the lacquer further hardens and strengthens the adhesive of the seam to a point where it resists the interior pressures and temperatures involved in the pasteurizing cycle. In this stage the adhesive also has an element of resilience in the adhesive seam coupled with strong resistance to creep or bond separation under the substantial pressures created by the development of gas pressure within the sealed container particularly at high temperature, e.g. 150° F. to 160° F. at pasteurizing.

Development of successive stages of hardness and strength may be achieved through the combination of predetermined relative proportions of a primary thermoplastic synthetic resin material possessing controlled crystallization ability and a synthetic polymer resin material which is amorphous and which cooperates both to give controlled delay in crystallizing of the primary resin and to reinforce the primary resin to give the desired strength and other physical properties in the adhesive bond. The resulting adhesive composition crystallizes only to a limited extent after application and formation of the seam so that it possesses limited yieldability which allows sufficient movement such that it is not ruptured by the stresses imposed by flanging operations on the container body. Subsequently a short heating to a temperature below the melting point of the adhesive, e.g. heating to dry an internal lacquer coating causes crystallization within the adhesive composition to proceed to a point giving greater strength and resistance to creep or bond separation under the pressures and temperatures involved, for example, in pasteurization of the filled container. A further factor is that the resin composition shrinks to a limited extent in the process of crystallization and this shrinkage occurs at a time when the metal of the container body is expanding under the action of heat. The resin mixture constituting the adhesive is caused to crystallize further at a slow rate even at the somewhat higher temperatures encountered in pasteurization so that the resin in the seam adapts itself to the expansion of the metal in the container before crystallization proceeds to a point where the dimensions of the adhesive are fixed. At the same time the crystallization which has developed provides strength and creep resistance necessary to withstand the rather susbtantial stresses created by pressure developed within the container.

The crystallizing tendency of the polymer resin constituting the major component of the adhesive may be controlled at least in part by the character of the polymer resin molecule. By way of illustration, a preferred type of polymer resin for the major component is an essentially linear mixed copolyester with a degree of regularity permitting association of the molecule in orderly fashion to enable crystallization. The polyester may be formed by condensation and polymerization of dibasic acids and alkylene glycols having an even number of carbon atoms greater than 1 but not over 10. Suitable dibasic acids include terephthalic acid and isophthalic acid, and aliphatic dibasic acids having from 6 to 12 carbon atoms such as suberic acid, adipic acid and dodecanoic acid, azelaic acid, sebacic acid. Terephthalic acid, because of its structure of having carboxyl groups arranged at opposite positions on a benzene ring is a factor tending to increase the crystallizability of polymers containing it. Isophthalic acid gives a markedly lower rate of crystallization because of the out-of-line relation of the carboxyl groups on the benzene ring. Sebacic, azelaic and comparable aliphatic dibasic acids introduce spacing between the benzene rings in the polymer chain and impart a flexibility to the polymer chain which aids in crystallization. Dimerized linoleic acids may also be included as a part of the acid component where it is desired to introduce the effect of its relatively long aliphatic chain. That is, the long chain of the dimerized acid does not aline in orderly fashion and provides an internal plasticizing action and imparts a more resilient character to the polymer resin. The major polymer material is prepared with an initial softening point (preferably determined by the differential thermal analyzer), above the maximum temperature to which the adhesive will be subjected in use.

In general the molar ratio of terephthalic acid to isophthalic acid may fall in the range of from about 12:1 to about 1:1 and there may be present up to about 35% of the aliphatic dibasic acid. As noted above the higher ratios of terephthalic to isophthalic increase the ability of the polymer to form strongly crystallized high melting bodies. On the other hand the presence of controlled amounts of the 6 to 12 carbon atom aliphatic dibasic acids allows crystallization but tends to give a lower melting point resinous material. Particularly useful mixed polyester materials have included products of esterification and condensation of 1,4-butane diol with terephthalic acid, isophthalic acid and 6 to 12 carbon atom dibasic aliphatic acid suitably sebacic acid in the molar percentages of about 70% to 55%:15% to 25%:8% to 25% respectively.

Following the principles outlined above the terephthalic acid, isophthalic acid and other acids may be combined in relative proportions to give resins having controlled crystallization ability effective to satisfy the requirements of melting point, strength and crystallizing action in combination with the amorphous polymer resin for use as a side seaming adhesive.

It is also possible to use more than one resin polymer to make up the crystallizable component of the adhesive. Thus, it is possible to use a proportion of a resin polymer which crystallizes at a moderate speed to provide development of early green strength, i.e. strength within a short time after completion of a seam to hold the parts together. Along with such moderate crystallization rate material there may be combined resin polymers which crystallize more slowly so that, for example, the crystallization of this portion of polymer is retarded until after flanging and is available to harden the adhesive composition further when the rate of crysallization is accelerated by the heating involved in drying the interior lacquer coating of a container.

The above discussion has related the development of stages of hardness by crysallization. It is to be understood, however, that the development of stages of hardness and strength may also be obtained through the combination of crystallization control and further polymerization of resinous components or interreaction between resinous components, or may involve such polymerization or interreaction alone. Systems for securing such development of properties can be readily devised by chemists following the teachings of the present case as to the advantages obtained through such progressive development of properties.

Amorphous hard, strong polymeric material for cooperation with the major polymer material is selected to have a molecular structure which is rigid and relatively bulky while at the same time having components in the molecular chain tending to associate with elements of the chain of the base polymer resin. Where the base polymer resin includes aromatic components with benzene rings in the molecular chain it is desirable that the amorphous polymer material also include such aromatic components. A preferred material for this use is a phenoxy resin prepared by reaction of Bis-phenol-A with epichlorohydrin and having repeating units as follows:

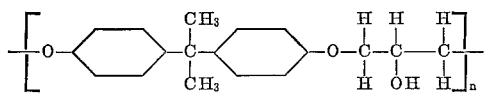

where $n$ is approximately 100.

With copolyester materials including terephthalic and isophthalic acid components the aromatic rings of the phenoxy resin are capable of associating with the aromatic rings of the polyester. This gives strength due to the boundary forces between these aromatic rings when the composition is in cool state. This factor also results in a locking together of the aromatic rings of the phenoxy and polyester; and the molecular chain of the phenoxy resin is sufficiently rigid to prevent inter-molecular slippage. A further advantage of the combination of phenoxy resin with the polyester resin is a marked increase in adhesive bond strength of metal over the bond strength obtained with the polyester resin alone.

On the other hand, when the composition including the polyester resin and the phenoxy resin is cooled from molten condition, the difference in spacing of the aromatic rings in the polyester resin and the phenoxy resin tends to retard the rate of crystallization of the polyester resin by interfering with normal orderly realinement of the equivalent configurations of adjacent polyester molecules.

Cooperation of the amorphous polymeric material with the crystallizable material to give the desired development of hardness through increasing extent of crystallization is controlled by the use of proper relative proportions of these materials. In general from about 5% to about 50% of the amorphous phenoxy resin, preferably 10% to 30%, based on the weight of the entire composition will give useful results. Determination of the best relative proportions in a given case depends on the properties of the polyester resin material and on the conditions which it is required that the adhesive be able to meet. Thus, with polyester resins having a high rate of crystallization it will be desirable to use a greater proportion of the amorphous material in order to reduce the overall crystallization rate of the adhesive mixture; and with slower crystallizing polyester resins lower relative proportions of the phenoxy resin material will be used.

Excellent results are obtained with adhesive compositions comprising one or more polyester resin materials in combination with the phenoxy resin without other additives. For special purposes, however, small percentages of other resin additives and small proportions and reinforcing or extending mineral fillers such as calcium silicate, silica aerogel and the like may be used.

The following examples are given to aid in understanding the invention; but it is to be understood that the invention is not limited to the particular materials, conditions, procedures or products there disclosed.

EXAMPLE I

A mixed polyester resinous material was prepared from esterification and condensation of 1,4-butane diol with dibasic acids. The total dibasic acids in the mixture were in the ratio of 6.2 mols of terephthalic acid, 2.0 mols of isophthalic acid and 1.5 mols of sebacic acid. The melting point of the material was 155° C. to 160° C. (B and R).

A further polyester material was prepared through esterification and condensation of 1,4-butane diol with acidic members in the ratio of 8 mols of terephthalic acid and 2 mols of isophthalic acid. The melting point of this resin was 185° C. to 192° C. (B and R), and its rate of crystallization was markedly greater than that of the first polyester resin material.

75 parts of the first polyester resinous material were melted and intimately mixed at 425° F. with 10 parts of the second polyester material and with 15 parts of phenoxy resin from reaction of bis-phenol-A with epichlorohydrin having repeating units as follows:

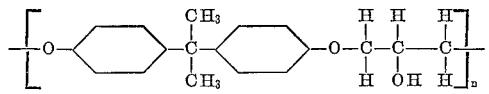

where $n$ is approximately 100, the melting point of the phenoxy resin being about 212° F. The combination of resins had a melting point over 325° F.

A blank B for a can body $2^{11}/_{16}$″ in diameter $4^{13}/_{16}$″ height was cut from 55 lb. base box weight double reduced 0.25 lb. tin plate can stock, the blank having 0.28″ wide side seaming margins 8 and 10 free from lithography.

The blank was preheated to 350° F. to 400° F. and the adhesive composition in molten state at 425° F. was applied as a 0.003 to 0.005 inch thick band 6 to the seaming margin 8 adjacent the edge 2 on the side $i$ which will be on the interior of the can.

The blank while being maintained at about 350° F. to 400° F. was sent to a forming station where it was bent to cylindrical shape. The temperature in the side seaming marginal areas 8 and 10 was raised to adhesive activation temperatures of 375° F. to 425° F. by an auxiliary heating device and the seaming margins were pressed together with the heat activated adhesive band 6 between them. Sufficient pressure was used to secure over-all adhesive wetting of the seaming margins. The seam S was held briefly while the adhesive cooled and set up.

The resulting cylindrical body was transported to a standard turret type flanger where the end edge portions 12 and 14 were flared out to provide flanges 16 and 18 to provide for receiving standard can ends 22 and 24. The adhesive seam S withstood the shearing stress imposed by this operation.

Lacquer was applied as a stripe to the interior along the seam area and the entire interior of the body was then sprayed with a conventional solvent base lacquer. The can was sent to a drying tunnel where the lacquer was dried at 280° F. for 10 minutes. No loss of bond occurred during the process. A first can end 22 was assembled with the body and the body was end seamed and sent to a standard processing and filling line including can turning, elevators, conveyors, accumulators and a 160° F. sterilizing. The body was then filled, a second can end 24 was applied to the body and was end seamed to form a completed filled can.

The filled can was then put through a pasteurizing process which involved subjecting to temperatures up to 160° F. or up to 30 minutes in the course of which internal pressure of 85 to 90 lbs. per sq. inch was developed. No leaking or rupture of the can occurred.

Further cans prepared and filled as described above were stored at 42° F. and at 80° F. prior to being given test drops of from 4 to 5 feet. In all cases of failure during the drop test, the failure occurred in the end seams rather than in the side seams.

EXAMPLE II

A polyester resinous material was prepared by esterification and condensation of 1,4-butane diol with acidic components in the ratio of 9.8 mols of terephthalic acid, 0.87 mols of isophthalic acid and 0.13 mols of linoleic acid dimer. The melting point of the polyester material was 375° F.

85 parts by weight of the above polyester were combined with 15 parts by weight of the phenoxy resin used in Example I, mixing being carried out at 425° F. The resulting adhesive composition had a melting point of 365° F.

The adhesive was used for side seaming of can stock following the procedure set forth in Example I. Comparable results were obtained.

Having thus described my invention, what I claim as new and desire to secure by Letters Patent of the United States is:

1. The method for making tubular containers including the steps of applying to a side seaming surface portion of a metallic container blank a thermoplastic synthetic resin body having controlled delay hardening ability, forming said blank into a tubular body with said side seaming surface portion disposed adjacent an opposite side seaming surface portion of said blank with said thermoplastic adhesive in heat-activated condition between said surface portions, pressing said surface portions together, cooling said adhesive to solidify it to hold said surface portions together as a completed seam, deforming portions of said tubular body, treating said thermoplastic adhesive of said seam to increase the hardness of said adhesive, thereafter attaching ends to said tubular body and treating said thermoplastic adhesive seam to harden it further, said thermoplastic adhesive comprising thermoplastic polymer resin material having controlled hardenability, whereby limited hardening occurs in the heat activation and seam completion step before said deformation, further hardening is obtainable before end attaching and still further hardening is obtainable after end attaching.

2. The method for making tubular containers including the steps of applying to a side seaming surface portion of a metallic container blank a thermoplastic synthetic resin body having controlled delay crystallization and hardening ability, forming said blank into a tubular body with said side seaming surface portion disposed adjacent an opposite side seaming surface portion of said blank with said thermoplastic adhesive in heat-activated condition between said surface portions, pressing said surface portions together, cooling said adhesive to solidify it to hold said surface portions together as a completed seam, thereafter deforming end edge portions of said tubular body to form end attaching flanges, heating said thermoplastic adhesive of said seam to harden said adhesive through controlled increase in crystallinity, thereafter attaching ends to said tubular body and heating said thermoplastic adhesive seam to harden it further through further crystallization, said thermoplastic adhesive comprising thermoplastic polymer resin material having controlled hardenability whereby limited hardening occurs in the heat activation and seam completion step before said deformation, further hardening is obtainable through a further limited heating before end attaching and still further hardening after end attaching is obtainable through extended heating.

3. The method for making tubular containers as defined in claim 2 in which said thermoplastic adhesive comprises a mixture of thermoplastic polymer resin having controlled hardenability through a restricted crystallization tendency and strong amorphous polymer resin compatible with said crystallizable first polymer resin and effective to reduce the crystallizing tendency of said first resin whereby limited hardening through crystallization occurs in the heat activation and seam completion step before end edge flanging, further hardening through crystallization is obtainable through a further limited heating and still further hardening through crystallization is obtainable after end attaching through extended heating.

4. The method for making tubular containers as defined in claim 3 in which the thermoplastic adhesive is an intimate mixture of a hard amorphous phenoxy polymer resin having the following structure

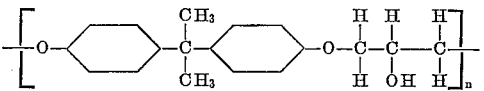

where $n$ is about 100, and crystallizable resinous linear polyester of linear glycol and dibasic acid components, said acid components comprising mixed terephthalic and isophthalic acids in the range of mol ratios of from 12:1 to 1:1, said glycol having the formula $HO(CH_2)_{n'}OH$ where $n'$ is an even number greater than 1 but not over 10, the benzene ring repeating units of said phenoxy resin and said polyester resin cooperating for reinforcement of the solidified adhesive, but said ring units of said phenoxy resin having a different spacing in the molecular chain from the benzene rings in said polyester resin to retard alinement of the molecules of said polyester resin, and said phenoxy resin being present in amount to delay development of crystallinity when said adhesive is cooled from heat activated condition but not to prevent crystallization on heating of the adhesive to temperatures below its melting point.

5. The method for making tubular containers as defined in claim 4 in which the thermoplastic components of the adhesive comprise from about 5% to about 50% by weight of said hard amorphous phenoxy resin polymer and from about 95% to about 50% of crystallizable resinous linear polyester of linear glycol and dibasic acid components, said acid components comprising at least about 65 mol percent of mixed terephthalic and isophthalic acids in the range of mol ratios of from 12:1 to 1:1 and up to 35 mol percent based on the total acid components of an aliphatic dibasic acid having at least 6 carbon atoms, said glycol having the formula $$HO(CH_2)_{n'}OH$$

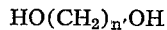

where $n'$ is an even number greater than 1 but not over 10.

6. The method for making tubular containers as defined in claim 4 in which the resinous linear polyester of said thermoplastic adhesive is a blend of a polyester which crystallizes at a rate providing early development of strength and a polyester which crystallizes more slowly to allow development of further hardness at a later stage by heating to accelerate its rate of crystallization.

7. The method for making tubular containers as defined in claim 5 containing from 10 to 30% of said amorphous phenoxy resin polymer and 90% to 70% of crystallizable polyester, said polyester comprising the product of esterification and condensation of 1,4-butane diol with acidic components in the molar percentages of from 70% to 55% of terephthalic acid, from 15% to 25% of isophthalic acid and from 8% to 25% of dibasic aliphatic acid having from 6 to 12 carbon atoms.

8. The method for making tubular containers as defined in claim 7 in which said resinous linear polyester is a blend of a polyester which crystallizes at a rate providing early development of strength and a polyester which crystallizes more slowly to allow development of further hardness at a later stage by heating to accelerate its rate of crystallization.

References Cited

UNITED STATES PATENTS

| | | | |
|---|---|---|---|
| 2,679,305 | 5/1954 | Gunthorp | 220—81 |
| 2,799,610 | 7/1957 | Magill | 220—81 |
| 2,912,398 | 11/1959 | Johnson et al. | 220—81 |

RONALD D. GREFE, *Primary Examiner.*

U.S. Cl. X.R.

220—75